(12) United States Patent
Burclaff et al.

(10) Patent No.: US 12,116,295 B2
(45) Date of Patent: Oct. 15, 2024

(54) CATALYTIC OXIDATION SYSTEM AND PROCESS FOR SELECTIVE CYANIDE REMOVAL

(71) Applicant: LUMMUS TECHNOLOGY LLC, Houston, TX (US)

(72) Inventors: Philip A. Burclaff, Weston, WI (US); Bryan J. Kumfer, Ringle, WI (US); Duane R. Smith, Edgar, WI (US)

(73) Assignee: LUMMUS TECHNOLOGY LLC, Houston, TX (US)

( * ) Notice: Subject to any disclaimer, the term of this patent is extended or adjusted under 35 U.S.C. 154(b) by 540 days.

(21) Appl. No.: 17/269,852

(22) PCT Filed: Aug. 9, 2019

(86) PCT No.: PCT/US2019/045826
§ 371 (c)(1),
(2) Date: Feb. 19, 2021

(87) PCT Pub. No.: WO2020/041007
PCT Pub. Date: Feb. 27, 2020

(65) Prior Publication Data
US 2021/0253458 A1    Aug. 19, 2021

Related U.S. Application Data

(60) Provisional application No. 62/721,980, filed on Aug. 23, 2018.

(51) Int. Cl.
*C02F 1/76* (2023.01)
*C02F 1/72* (2023.01)
(Continued)

(52) U.S. Cl.
CPC .............. *C02F 1/725* (2013.01); *C02F 1/722* (2013.01); *C02F 1/76* (2013.01); *B01J 23/755* (2013.01);
(Continued)

(58) Field of Classification Search
CPC .. C02F 1/72; C02F 1/722; C02F 1/725; C02F 1/76; C02F 1/66; C02F 1/4674;
(Continued)

(56) References Cited

U.S. PATENT DOCUMENTS 4,141,828 A    2/1979    Okada et al.
4,732,688 A    3/1988    Bryan et al.
(Continued)

FOREIGN PATENT DOCUMENTS

CN    1370618 A    9/2002
CN    101077443 A    11/2007
(Continued)

OTHER PUBLICATIONS

"Experimental Study on Purification of Underground Water Gushing in a Gold Mine in Gansu Province", Lin Zhongyuan, Chinese Selected Doctoral Dissertations and Master's Theses Full-Text Databases (master), Engineering Science and Technology I (Monthly Publication), No. 06, B021-55, Jun. 15, 2017.
(Continued)

*Primary Examiner* — Chester T Barry
(74) *Attorney, Agent, or Firm* — Calfee, Halter & Griswold LLP

(57) ABSTRACT

There are provided systems (10) and processes for the selective removal of cyanide from a wastewater stream (12) comprising cyanide and an amount of organic compounds therein.

6 Claims, 3 Drawing Sheets

(51) Int. Cl.
*B01J 23/755* (2006.01)
*C02F 101/18* (2006.01)

(52) U.S. Cl.
CPC ...... *C02F 2101/18* (2013.01); *C02F 2209/06* (2013.01)

(58) Field of Classification Search
CPC .............. C02F 2101/18; C02F 2101/30; C02F 2103/00; C02F 2209/06; C02F 2209/03; C02F 2209/04; C02F 2209/08; C02F 2103/365; C02F 101/18; B01J 23/755; B01J 23/76
See application file for complete search history.

(56) References Cited

U.S. PATENT DOCUMENTS

| | | |
|---|---|---|
| 4,743,381 A | 5/1988 | Bull |
| 5,039,429 A | 8/1991 | Laundon et al. |
| 5,552,063 A * | 9/1996 | Yan .................. C02F 1/281 |
| | | 210/908 |
| 5,635,078 A * | 6/1997 | Yan .................. C02F 1/586 |
| | | 210/903 |
| 5,792,336 A | 8/1998 | Nikolaevsky et al. |
| 2002/0100734 A1* | 8/2002 | Lee .................. B01J 23/835 |
| | | 210/760 |

FOREIGN PATENT DOCUMENTS

| | | | | |
|---|---|---|---|---|
| CN | 102476850 A | | 5/2012 | |
| CN | 108483608 A | * | 9/2018 | |
| JP | S5527075 A | | 2/1980 | |
| WO | WO-9528357 A1 | * | 10/1995 | .............. C02F 1/281 |

OTHER PUBLICATIONS

PCT International Search Report and Written Opinion of the International Searching Authority mailed Oct. 16, 2019 corresponding to PCT Application No. PCT/US2019/045826 filed Aug. 9, 2019.

* cited by examiner

CATALYTIC OXIDATION SYSTEM AND PROCESS FOR SELECTIVE CYANIDE REMOVAL

FIELD

The present invention relates generally to wastewater treatment processes, and in particular to processes for selective removal of cyanide from wastewater comprising both an amount of cyanide and organic compounds (organics).

BACKGROUND

Even small amounts of problematic wastewater can create large issues for a wastewater treatment plant. Cyanide is a known contaminant in many industrial and refinery processes and often must be removed from the wastewater to below acceptable limits prior to reuse, discharge, or the like. Cyanide can be extremely toxic to living organisms, and thus is particularly dangerous if entering any water supply. In addition to cyanide, these cyanide-containing wastewaters often other components present, for example, chemical oxygen demand (COD), which typically comprise organic compounds (organics). Depending on the applications, it may not be necessary to remove both the COD and the cyanide, but rather solely or primarily the cyanide. However, known processes have little selectively between cyanide and COD. As a result, many treatment systems for removing cyanide have a larger capacity, utilize more materials, and have longer processing times than is necessary for removing the cyanide as the necessary materials for destroying the cyanide will be utilized on the COD.

By way of example, hydrothermal systems (e.g., wet air oxidation and hydrolysis) have been used to treat cyanide. Hydrothermal systems are very expensive to build and operate. If cyanide is the primary or sole target contaminant to be destroyed, the hydrothermal system becomes rapidly unreasonably expensive for the small amounts of cyanide therein. In addition, in some instances, it may be desirable to recover the organics portion. In such cases, these hydrothermal systems will undesirably oxidize or hydrolyze the organic compounds, thereby denying their recovery.

An additional method of cyanide removal involves the contact of the cyanide-containing wastewater with hydrogen peroxide or sulfide dioxide in the presence of a copper catalyst. Unfortunately, in addition to the cyanide, the hydrogen peroxide or sulfide dioxide will also react with the COD, thereby requiring significantly more hydrogen peroxide or sulfur dioxide for the cyanide treatment. In addition, any remaining COD following treatment may also interfere with recovery of the copper catalyst, thereby increasing catalyst costs as soluble copper will be required to be constantly added to the wastewater. Soluble copper may also prohibit the disposal or discharge of the wastewater if it cannot be sufficiently recovered.

Two additional methods for cyanide removal are alkaline chlorination and iron precipitation. In the latter, the iron can also undesirably complex with the COD, as well as the cyanide. In the former, chlorine may also oxidize the COD, as well as the cyanide. Thus, in both cases, again additional materials for the cyanide removal are required because of the interference of COD and the lack of selectivity between cyanide and COD. In the same way, activated carbon can adsorb cyanide, but will also adsorb many organic compounds. Still further, both iron precipitation and carbon adsorption require solids disposal, which still may be classified as a hazardous material. Accordingly, for the reasons above, known methods do not provide a desirable solution for the selective removal of cyanide from a wastewater comprising both cyanide and COD.

SUMMARY

In accordance with an aspect of the present invention, there are provided systems and processes for the selective removal of cyanide from a wastewater comprising an amount of cyanide and chemical oxygen demand (COD). The systems and processes utilize readily available and inexpensive materials, thereby maintaining low costs for cyanide removal. In addition, the inventors have surprisingly found the systems and processes described herein selectively remove cyanide relative to the COD in wastewaters containing both, thereby eliminating the needless overuse of materials as described above, particularly where COD removal is not of interest.

In accordance with an aspect, there is provided a process for the selective removal of cyanide from a wastewater comprising both cyanide and COD. The process comprises contacting the wastewater with an amount of an oxidant in the presence of a nickel-based oxide catalyst to selectively remove an amount of the cyanide relative to the chemical oxygen demand from the wastewater.

In accordance with another aspect, there is provided a system for the selective removal of cyanide from a wastewater comprising both a cyanide and a chemical oxygen demand (COD) concentration. The system comprises a vessel comprising an amount of the wastewater, and an amount of an oxidant and a nickel-based oxide catalyst therein effective to selectively remove an amount of the cyanide relative to the chemical oxygen demand from the wastewater.

DETAILED DESCRIPTION

Figure 1:
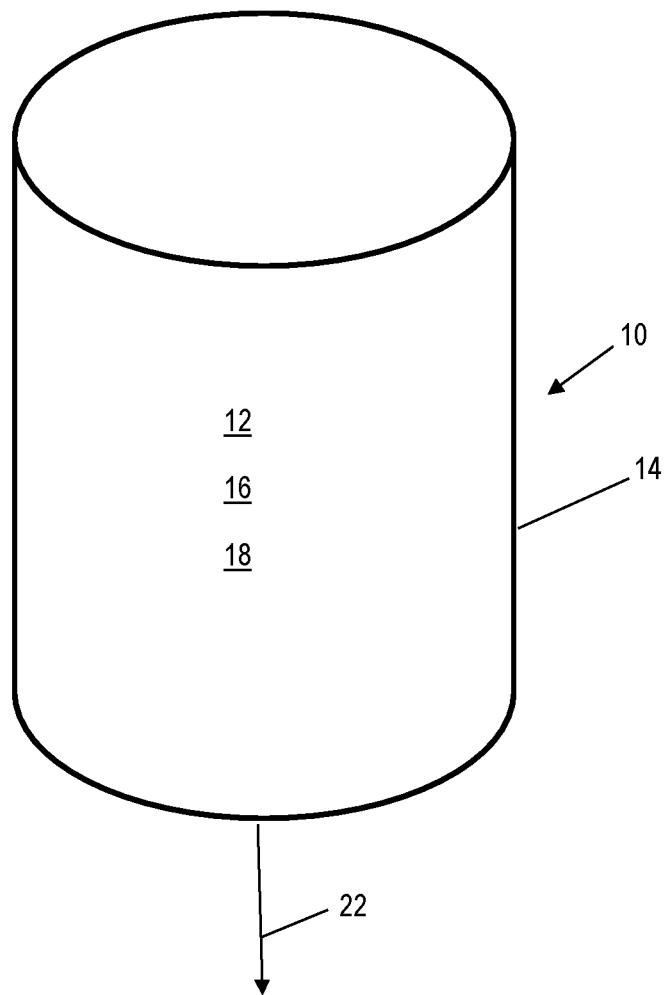
FIG. 1 illustrates a system for selectively removing cyanide from a wastewater stream in accordance with an aspect of the present invention.

Now referring to the drawings, FIG. 1 illustrates a system 10 selectively removing an amount of cyanide in a wastewater 12 comprising both cyanide and organic compounds therein. FIG. 1 illustrates a vessel 14 which comprises an amount of the wastewater 12, an amount of an oxidant 16, and an amount of a nickel-based oxide catalyst 18 therein. The wastewater 12 may comprise any fluid comprising an amount of cyanide and chemical oxygen demand (COD) therein. The COD comprises an amount of oxidizable organic compounds such as alcohols, aldehydes, carboxylic acids, olefins, aromatic and cyclic hydrocarbons, ketones, phenols, ethers, amines, carboxylates, substituted hydrocarbons, pesticides, herbicides, or the like. In an embodiment, the wastewater 12 comprises a byproduct of industrial process, such as a refinery process. In certain embodiments, the wastewater 12 is one where cyanide is to be reduced below a predetermined level, but it is desired that a majority (>50% concentration thereof) of the COD remains in the wastewater 12 following treatment.

Figure 2:
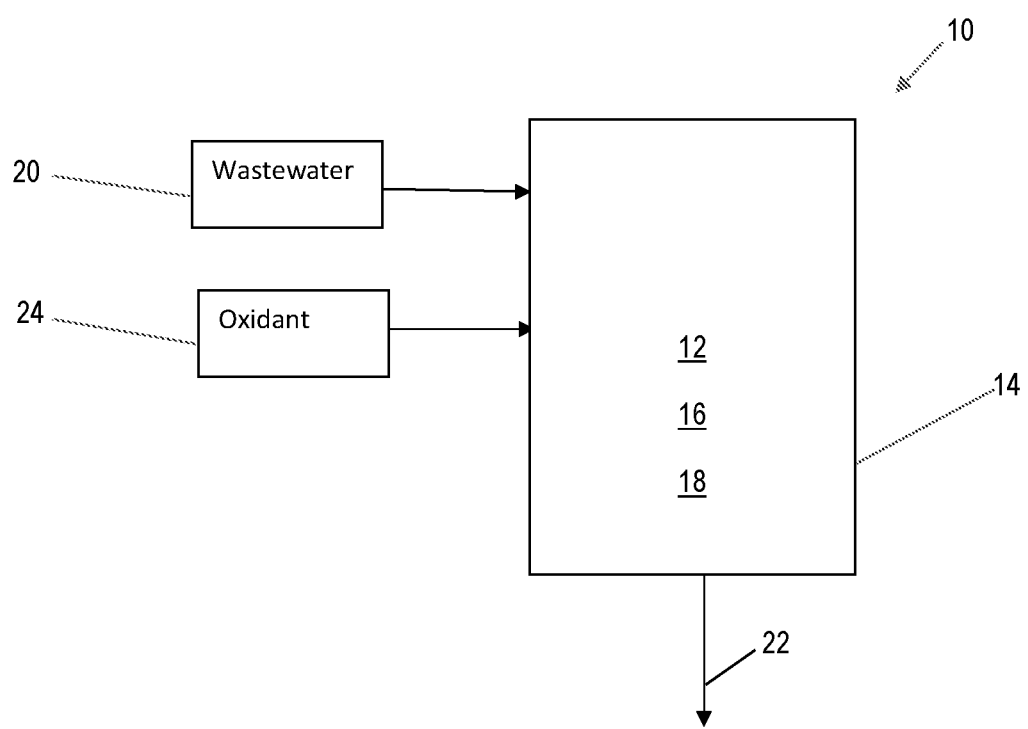
FIG. 2 illustrates another embodiment of a system for selectively removing cyanide from a wastewater stream in accordance with an aspect of the present invention.

The wastewater 12 may be introduced into the vessel by any suitable method or structure. In an embodiment, as shown in FIG. 2, there is shown a source 20 of the wastewater 12 in fluid communication with the vessel 14. In certain embodiments, the source 20 may comprise an output from the one or more industrial processes. In addition, in certain embodiments, one or more pumps may be provided to assist in the delivery of the wastewater 12 to the vessel 14.

The oxidant 16 may be provided within the vessel 14 by any suitable method or structure. In an embodiment, as shown in FIG. 2, the oxidant 16 is provided from a suitable source 24 thereof in fluid communication with the vessel 14. The amount of oxidant 16 provided in the vessel 14 is an amount effective to reduce an amount of the cyanide in the wastewater 12 below a predetermined level in the presence of the catalyst 18. In addition, in an embodiment, the oxidant 16 comprises hypochlorite, hydrogen peroxide, or mixtures thereof. In a particular embodiment, the oxidant 16 comprises hypochlorite. Experimentation by the present inventors has shown that hypochlorite exhibits superior selectivity for cyanide removal in the presence of COD relative to hydrogen peroxide. This factor however may be weighed against the cheaper cost of hydrogen peroxide. When the oxidant 16 comprises hypochlorite, the hypochlorite is provided in salt form as, for example, sodium hypochlorite. In other embodiments, the hypochlorite may be provided from a separate treatment process. For example, in certain embodiments, an electrooxidation process may be utilized to treat the organic compounds in the wastewater 12, and the electrooxidation process generates an amount of hypochlorite, which may be delivered to the vessel 14.

The nickel-based oxide catalyst 18 may be provided in an amount effective to improve a degree of removal of cyanide in the wastewater relative to the process without its use. In addition, the nickel-based oxide catalyst 18 may comprise any suitable oxide material comprising an amount of nickel. In an embodiment, the nickel-based oxide comprises nickel oxide. In a particular embodiment, the nickel-based oxide catalyst 18 comprise a nickel-based oxide catalyst commercially available from Johnson Matthey Catalysts, Pasadena, TX.

The nickel-based oxide catalyst 18 may further be provided in any suitable form. In an embodiment, the nickel-based catalyst is provided as a fixed catalyst bed in the vessel 14. In other embodiments, the catalyst 18 may be delivered to the vessel 14 from a suitable source thereof. In this way, the catalyst bed need only be replaced occasionally as it will not flow out in a treated stream 22 or other effluent from the vessel 14, or require special recovery steps as is the case with conventional soluble catalysts. As discussed above, in one aspect, the materials used herein for the selective removal are cyanide are readily commercially available and inexpensive, thereby enabling an inexpensive process for selective cyanide removal which maintains the organics content substantially as is in the wastewater stream 12.

In an embodiment, the treatment of the wastewater 12 takes place at a pH that optimally promotes cyanide removal and maintains the integrity of the catalyst. In certain embodiments, the pH in the vessel 14 during the contacting of the wastewater 12 with the oxidant 16 and catalyst 18 is a pH of 8 or greater, and in a particular embodiment is a pH of 9 or greater. Particularly, below a pH of 8, the nickel-based oxide catalyst 18 may begin to degrade and will need to be replenished more readily.

Figure 3:
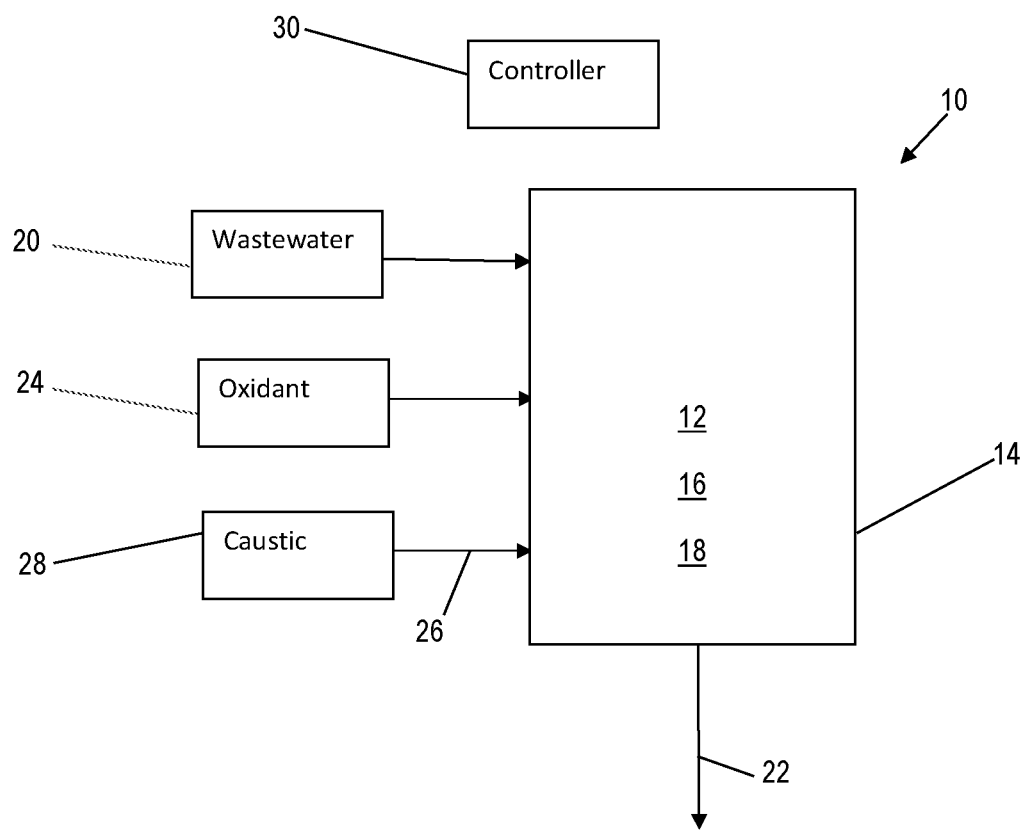
FIG. 3 illustrates yet another embodiment of a system for selectively removing cyanide from a wastewater stream in accordance with an aspect of the present invention.

In certain embodiments, as shown in FIG. 3, a source 28 of a caustic 26 is provided in fluid communication with the vessel 14 to maintain the pH of 8 or more during the cyanide removal process. The caustic 26 may comprise any suitable material which will not interfere with the cyanide removal process, such as sodium hydroxide. It is noted that if the pH is less than 8, the process will still accomplish its desired aims, but catalyst replenishment may be required sooner than if the pH were 8 or more. In certain embodiments, the pH in the vessel 14 during the contacting of the wastewater 12 with the oxidant 16 and catalyst 18 is less than 8 but is greater than 4.5. When hypochlorite is utilized, undesired chlorine gas may be produced from the hypochlorite at a pH of less 4.5.

For ease of illustration, the wastewater, oxidant, and caustic sources are illustrated as independent components providing delivery of the respective material to the vessel 14 in FIGS. 2-3. However, it is appreciated that the present invention is not so limited. In certain embodiments, one or more of the materials 12, 16, 18, 26 (when present) may be mixed outside of the vessel 14 and collectively delivered to the vessel 14.

In certain embodiments, pH sensors are associated with the vessel 14 to monitor a pH of the materials therein. As shown in FIG. 3, a controller 30 may be electrical communication with the pH sensors or any other suitable sensors, as well as any other source of fluids, or the like to control the introduction of the wastewater pH, caustic, hypochlorite, catalyst, or other material as the case may be to the vessel 14.

In addition to the pH, the cyanide removal process in the vessel 14 may take place at any suitable temperature, pressure, and duration effective to generate a treated stream 22 having a cyanide concentration at or below a predetermined level. In an embodiment, the predetermined level is 5.0 mg/L or less. In addition, in an embodiment, the contacting of the wastewater 12 with the hypochlorite in the presence of the catalyst ("contacting") is done for a duration of from 0.5 to 24 hours. Further, in an embodiment, the contacting is done at a temperature of 50° C. or less and at a pressure of 50 psi or less.

As a result of the cyanide removal process and system 10, a treated stream 22 which comprises a reduced amount of cyanide therein relative to the wastewater 12 with its COD concentration remaining. In an embodiment, at least 50% of a COD concentration in the wastewater stream 22 is maintained after the contacting of the wastewater 12 with the hypochlorite and the catalyst ("contacting step") and at least 75% of a concentration of the cyanide is reduced after the contacting step. In particular embodiments, the cyanide concentration in the treated stream 22 comprises a cyanide concentration of 5.0 mg/L or less. Once generated, the treated stream 22 may be readily directed to reuse, delivery, a separate process for organics treatment, or the like.

The vessel 14 may comprise any suitable inert material having an internal cavity having a size, shape, and volume suitable for the intended application. In addition, it is appreciated that more than one vessel 14 may be utilized in the system 10 in series or in parallel in order to additional processing capacity when desired. In such cases, additional wastewater, hypochlorite, catalyst, or caustic sources may be provided if necessary or the particular material may be delivered to the multiple vessels 14 from a common source.

To summarize, aspects of the present invention are directed to a selective cyanide-containing wastewater treatment system and process. In certain aspects, the systems and processes employ a catalyst which is much less expensive than conventional methods using soluble copper, for example, which would constantly need to be added and recovered. In addition, the oxidant, particularly hypochlorite, preferentially reacts with the catalyst/cyanide over the organics present, again reducing chemical cost by leaving the organics alone.

In the systems and processes described herein, it is appreciated that one or more inlets, pathways, outlets, mixers, pumps, valves, coolers, energy sources, flow sensors, or controllers (comprising a microprocessor and a memory), or the like may be included in any of the systems described herein for facilitating the introduction, output, timing, volume, selection, and direction of flow of any of the components or materials set forth therein. Moreover, the skilled artisan would understand the volumes, flow rates, concentrations, and other parameters necessary to achieve the desired result(s) can be determined by known processes.

The function and advantages of these and other embodiments of the present invention will be more fully understood from the following examples. These examples are intended to be illustrative in nature and are not considered to be limiting the scope of the invention.

EXAMPLE

The following examples illustrate the selective removal of cyanide from a high COD and cyanide-containing waste stream.

Experimental Setup

First, two peristaltic pumps were used, one pumping feed wastewater and the other the oxidant, with the two streams combined with a tee prior to entering the bottom of the column. The column was a PVC pipe filled with one liter of a nickel oxide catalyst from Johnson Matthey Catalysts held in place with screens on top and bottom. The wastewater and oxidant flowed from bottom up and went once through the column from the feed to the effluent. All of the runs performed used calculated feed/oxidant flow rates to achieve a 60 minute empty bed residence time. Both the sodium hypochlorite and hydrogen peroxide were 6% solutions by weight. The feed was adjusted to 8-9 pH with NaOH.

Potassium Ferricyanide

The first tests were performed using potassium ferricyanide ($K_3Fe(CN)_6$) as it is a much safer/less toxic form of cyanide. Previous investigations into cyanide suggest that ferricyanide is a more stable/difficult to treat ion compared to CN-cyanide. The first test indicated complete destruction of the cyanide so two additional tests were run, one with less bleach (sodium hypochlorite) and one with propylene glycol to be a source of high background COD. The results of these three tests are in Table 1 below.

TABLE 1

Results of testing using potassium ferricyanide.

| Feed CN (mg/L) | 85 | 104 | 110 |
| --- | --- | --- | --- |
| 1 BV Eff (mg/L) | ND | ND | ND |
| 2 BV Eff (mg/L) | ND | ND | ND |
| 3 BV Eff (mg/L) | ND | ND | ND |
| Feed COD (mg/L) | — | — | 3360 |

ND for cyanide is below 0.005 mg/L.

In all three tests, the effluent cyanide was below the limit of detection. Even the test with propylene glycol adding background COD, the cyanide was removed while the COD dropped by about 10%. This suggests that the catalyst selectively oxidized the cyanide before the organics.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process for selective removal of cyanide from a wastewater (12) comprising both cyanide and chemical oxygen demand (COD), the process comprising:
   contacting the wastewater (12) with an amount of an oxidant (16) in the presence of a nickel-based oxide catalyst (18) to selectively remove an amount of the cyanide from the wastewater (12) in a vessel (14); and
   maintaining a pH of 8 or more during the contacting of the wastewater (12) with the oxidant (16) and the nickel-based oxide catalyst (18),
   wherein maintaining the pH is done via the addition of a caustic (26) to the vessel (14),
   wherein pH sensors are associated with the vessel (14) to monitor the pH within the vessel (14), and
   wherein a controller (30) is in electrical communication with the pH sensors and is in electrical communication with a source (28) of the caustic (26) for controlling an amount of the caustic delivered to the vessel (14).

2. The process of claim 1, wherein the oxidant (16) comprises a member selected from the group consisting of hypochlorite, hydrogen peroxide, and mixtures thereof.

3. The process of claim 1, further comprising maintaining a pH of 9 or more during the contacting.

4. The process of claim 1, wherein at least 50% of a concentration of the chemical oxygen demand of the wastewater (12) is maintained after the contacting, and wherein at least 75% of a concentration of the cyanide is reduced after the contacting.

5. The process of claim 1, wherein the process generates a treated stream (22) comprising a cyanide concentration of 5.0 mg/L or less.

6. The process of claim 1, wherein the contacting is done at a temperature of 50° C. or less and at a pressure of 50 psi or less.

* * * * *